United States Patent
Hasegawa

(10) Patent No.: US 9,419,320 B2
(45) Date of Patent: Aug. 16, 2016

(54) NONRECIPROCAL CIRCUIT ELEMENT AND TRANSCEIVER DEVICE

(71) Applicant: Murata Manufacturing Co., Ltd., Nagaokakyo-shi, Kyoto-fu (JP)

(72) Inventor: Takashi Hasegawa, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 14/307,579

(22) Filed: Jun. 18, 2014

(65) Prior Publication Data

US 2014/0295779 A1 Oct. 2, 2014

Related U.S. Application Data

(63) Continuation of application No. PCT/JP2012/073257, filed on Sep. 12, 2012.

(30) Foreign Application Priority Data

Dec. 20, 2011 (JP) ................................. 2011-277769

(51) Int. Cl.
*H04B 1/38* (2015.01)
*H01P 1/38* (2006.01)
(Continued)

(52) U.S. Cl.
CPC *H01P 1/38* (2013.01); *H01P 1/387* (2013.01); *H04B 1/44* (2013.01); *H04B 1/52* (2013.01)

(58) Field of Classification Search
CPC .................... H01L 2924/0002; H01L 2924/00; H01L 23/50; H01L 23/552; H01L 2924/3011; H01L 2224/45144; H01L 2924/3025; H01L 2224/48091; H01L 2924/12041; H01L 2924/13091; H01L 2924/30107; H01L 2224/4847; H01L 2924/00014; H01P 1/387; H01P 11/00; H01P 1/215; H01P 1/36; H01P 1/218; H01P 1/38
USPC ...................................................... 455/75, 73
See application file for complete search history.

(56) References Cited

U.S. PATENT DOCUMENTS 5,821,830 A 10/1998 Hasegawa
2002/0153963 A1 10/2002 Kawanami
(Continued)

FOREIGN PATENT DOCUMENTS

JP 09-232818 A 9/1997
JP 2002-299915 A 10/2002
(Continued)

OTHER PUBLICATIONS

Official Communication issued in International Patent Application No. PCT/JP2012/073257, mailed on Nov. 20, 2012.

*Primary Examiner* — Ajibola Akinyemi
(74) *Attorney, Agent, or Firm* — Keating & Bennett, LLP

(57) ABSTRACT

A nonreciprocal circuit element is configured so that a first center electrode and a second center electrode are arranged on a ferrite, to which a direct current magnetic field generated by a permanent magnet is applied, so as to cross each other and be insulated from each other. One end portion of the first center electrode is connected to a first unbalanced input/output port and one port of a plurality of balanced input/output ports and the other end portion of the first center electrode is connected to ground. One end portion of the second center electrode is connected to a second unbalanced input/output port and the other port of the balanced input/output ports and the other end of the second center electrode is connected to the ground. The one end portion of the first center electrode is connected to the ground via a first capacitor element, and the one end portion of the second center electrode is connected to the ground via a second capacitor element.

20 Claims, 8 Drawing Sheets

(51) Int. Cl.
*H01P 1/387* (2006.01)
*H04B 1/44* (2006.01)
*H04B 1/52* (2015.01)

(56) References Cited

U.S. PATENT DOCUMENTS

2005/0052256 A1* 3/2005 Hasegawa .................. H01P 1/36
 333/24.2
2005/0190007 A1 9/2005 Kawanami
2006/0132255 A1* 6/2006 Kawanami ..................... 333/1.1
2006/0273869 A1* 12/2006 Jachowski ............ H01P 1/2039
 333/204
2009/0302964 A1 12/2009 Coustou et al.

FOREIGN PATENT DOCUMENTS

JP 2004-282626 A 10/2004
JP 2009-525652 A 7/2009

* cited by examiner

INSERTION LOSS (dB) OF P4→P3

M1: 698.00 MHz
    -1.081 dB
M2: 806.50 MHz
    -0.745 dB
M3: 915.00 MHz
    -0.889 dB

INSERTION LOSS (dB) OF P3→P5, P6

M1: 728.00 MHz
    -1.751 dB
M2: 844.00 MHz
    -1.130 dB
M3: 960.00 MHz
    -1.431 dB

M1:698.00 MHz
    -15.919 dB
M2:829.00 MHz
    -17.550 dB
M3:960.00 MHz
    -19.622 dB

ISOLATION (dB) OF
P4→P5, P6

NONRECIPROCAL CIRCUIT ELEMENT AND TRANSCEIVER DEVICE

BACKGROUND OF THE INVENTION

1. Field of the Invention

The present invention relates to nonreciprocal circuit elements, and in particular, circulators for use in a microwave band. The present invention also relates to transceiver devices that include circulators and are installed in cellular phones and the like.

2. Description of the Related Art

Conventionally, circulators have a property that a signal is transmitted only in a predetermined direction and is not transmitted in the opposite direction. This property allows the circulator to be used in a transceiver circuit module of mobile communication device such as a cellular phone or the like.

As a circulator of this type, Japanese Unexamined Patent Application Publication No. 9-232818 describes a circulator in which a first center electrode and a second center electrode are arranged on a ferrite, to which a direct-current magnetic field is applied, so that the first center electrode and the second center electrode cross each other while being electrically insulated from each other. Japanese Unexamined Patent Application Publication No. 9-232818 further describes that end portions of the first and second center electrodes form first and second input/output ports, respectively, and that one of the other end portions of the first and second center electrodes forms a third input/output port. This circulator has improved insertion characteristics and isolation characteristics compared with conventional ones.

In coming years, multiband-use and multimode-use of cellular phones may be further advanced to be compatible with multiple communication systems, and these advancements require a cellular phone to have wide-bandwidth such as a factional bandwidth of 30%. However, the circulator has a problem that the isolator characteristic is narrower in view of required wideband use in coming years. That is, in the circulator, a 10-dB isolation bandwidth is 140 MHz with a center frequency of 1.5 GHz, and the fractional bandwidth is about 9% (140/1500).

Further, in the circulator, the center electrode is not connected to ground. Thus, there is a problem that, when being mounted on a circuit board or the like, stray capacitance is formed between the center electrode and the ground of the board and causes the characteristics to shift.

SUMMARY OF THE INVENTION

Thus, preferred embodiments of the present invention provide a nonreciprocal circuit element and a transceiver device, each having preferable isolation characteristics, a wider fractional bandwidth, and stable characteristics.

A nonreciprocal circuit element according to a first preferred embodiment of the present invention includes a first center electrode and a second center electrode arranged on a ferrite, to which a direct current magnetic field generated by a permanent magnet is applied, so as to cross each other while being insulated from each other; one end portion of the first center electrode is connected to a first unbalanced input/output port and one of a plurality of balanced input/output ports and the other end portion of the first center electrode is connected to ground; one end portion of the second center electrode is connected to the other port of the balanced input/output ports and a second unbalanced input/output port and the other end portion of the second center electrode is connected to the ground; the one end portion of the first center electrode is connected to the ground via a first capacitor element, and the one end portion of the second center electrode is connected to the ground via a second capacitor element.

A transceiver device according to a second preferred embodiment of the present invention includes a nonreciprocal circuit element, an antenna, a receiver side port, and a transmitter side port. In the nonreciprocal circuit element, a first center electrode and a second center electrode are arranged on a ferrite, to which a direct current magnetic field generated by a permanent magnet is applied, so as to cross each other while being insulated from each other, one end portion of the first center electrode is connected to a first unbalanced input/output port and one of balanced input/output ports and the other end portion of the first center electrode is connected to ground, one end portion of the second center electrode is connected to a second unbalanced input/output port and the other port of the balanced input/output ports and the other end portion of the second center electrode is connected to the ground, the one end portion of the first center electrode is connected to the ground via a first capacitor element, and the one end portion of the second center electrode is connected to the ground via a second capacitor element. Further, the first unbalanced input/output port is connected to the transmitter side port, the balanced input/output port is connected to the antenna, and the second unbalanced input/output port is connected to the receiver side port.

In the nonreciprocal circuit element and the transceiver device described above, a high frequency (transmitting) signal inputted to the first unbalanced input/output port is outputted in-phase to the one of the balanced input/output ports and outputted in reversed phase to the other port. No signal is transmitted to the second unbalanced input/output port due to strong attenuation. A high frequency (received) signal inputted to the balanced input/output ports is outputted from the second unbalanced input/output port. No signal is transmitted to the first unbalanced input/output port due to strong attenuation. A high frequency signal inputted to the second unbalanced input/output port is not outputted from the balanced input/output ports since it is outputted in-phase to both of the balanced input/output ports, but flows to the first unbalanced input/output port. Further, the first and second center electrodes are both connected to the ground. Thus, stray capacitance generated when mounted on a circuit board is reduced or prevented as much as possible. The frequency of transmitting signal is primarily determined by the inductance component of the first center electrode and the capacitance component of the first capacitor element. The frequency of received signal is primarily determined by the inductance component of the second center electrode and the capacitance component of the second capacitor element. As described above, one of the ports of the nonreciprocal circuit element is configured as the balanced input/output port, allowing the nonreciprocal circuit element to function as a circulator. Accordingly, the nonreciprocal circuit element is preferably used as a circulator with preferable isolation characteristics and a wider fractional bandwidth, as will be described in detail in the following preferred embodiments of the present invention.

A nonreciprocal circuit element according to a third preferred embodiments of the present invention includes a first center electrode and a second center electrode arranged on a ferrite, to which a direct current magnetic field generated by a permanent magnet is applied, so as to cross each other while being insulated from each other, one end portion of the first center electrode is connected to one of a plurality of balanced input/output ports and a first unbalanced input/output port, one end portion of the second center electrode is connected to the other end portion of the first center electrode as well as a second unbalanced input/output port and the other port of the balanced input/output ports and the other end portion of the second center electrode is connected to ground, a first capacitor element is connected between the balanced input/output ports in parallel to the first center electrode, and the one end portion of the second center electrode is connected to the ground via a second capacitor element.

A transceiver device according to a fourth preferred embodiment of the present invention includes a nonreciprocal circuit element, an antenna, a receiver side port, and a transmitter side port. In the nonreciprocal circuit element, a first center electrode and a second center electrode are arranged on a ferrite, to which a direct current magnetic field generated by a permanent magnet is applied, so as to cross each other while being insulated from each other, one end portion of the first center electrode is connected to one of balanced input/output ports and a first unbalanced input/output port, one end portion of the second center electrode is connected to the other end portion of the first center electrode as well as a second unbalanced input/output port and the other port of the balanced input/output ports and the other end portion of the second center electrode is connected to ground, a first capacitor element is connected between the balanced input/output ports in parallel to the first center electrode, and the one end portion of the second center electrode is connected to the ground via a second capacitor element. Further, the first unbalanced input/output port is connected to the antenna, the balanced input/output port is connected to the receiver side port, and the second unbalanced input/output port is connected to the transmitter side port.

In the nonreciprocal circuit element according to the third preferred embodiment of the present invention and the transceiver device according to the fourth preferred embodiment of the present invention, a high frequency (received) signal inputted to the first unbalanced input/output port is outputted in-phase to the one of the balanced input/output ports and outputted in reversed phase to the other port. No signal is transmitted to the second unbalanced input/output port due to strong attenuation. A high frequency (transmitting) signal inputted to the second unbalanced input/output port is not outputted from the balanced input/output ports since it is outputted in-phase to both of the balanced input/output ports, but is outputted from the first unbalanced input/output port to the antenna. A high frequency signal inputted to the balanced input/output ports is outputted from the second unbalanced input/output port. No signal is transmitted to the first unbalanced input/output port due to strong attenuation. Further, the second center electrode is connected to the ground. Thus, stray capacitance generated when mounted on a circuit board is reduced or prevented as much as possible. The frequency of received signal is primarily determined by the inductance component of the first center electrode and the capacitance component of the first capacitor element. The frequency of transmitting signal is primarily determined by the inductance component of the second center electrode and the capacitance component of the second capacitor element. As described above, one of the ports of the nonreciprocal circuit element is configured as the balanced input/output port, allowing the nonreciprocal circuit element to function as a circulator. Accordingly, the nonreciprocal circuit element is preferably used as a circulator with preferable isolation characteristics and a wider fractional bandwidth, as will be described in detail in the following preferred embodiments of the present invention.

A transceiver device according to a fifth preferred embodiment of the present invention includes a nonreciprocal circuit element, an antenna, a receiver side port, and a transmitter side port. In the nonreciprocal circuit element, a first center electrode and a second center electrode are arranged on a ferrite, to which a direct current magnetic field generated by a permanent magnet is applied, so as to cross each other while being insulated from each other, one end portion of the first center electrode is connected to one of a plurality of balanced input/output ports and a first unbalanced input/output port, one end portion of the second center electrode is connected to the other end portion of the first center electrode as well as a second unbalanced input/output port and the other port of the balanced input/output ports and the other end portion of the second center electrode is connected to ground, a first capacitor element is connected between the balanced input/output ports in parallel to the first center electrode, and the one end portion of the second center electrode is connected to the ground via a second capacitor element. Further, the first unbalanced input/output port is connected to the antenna, the balanced input/output port is connected to the transmitter side port, and the second unbalanced input/output port is connected to the receiver side port.

In the transceiver device according to the fifth preferred embodiment of the present invention, a high frequency (received) signal inputted to the first unbalanced input/output port is not outputted from the balanced input/output ports since it is outputted in-phase to both of the balanced input/output ports, but is outputted to the second unbalanced input/output port. A high frequency (transmitting) signal inputted to the balanced input/output ports is outputted from the first unbalanced input/output port to the antenna. No signal is transmitted to the second unbalanced input/output port due to strong attenuation. A high frequency signal inputted to the second unbalanced input/output port is outputted in-phase to the one port of the balanced input/output ports and outputted in reversed phase to the other port. No signal is transmitted to the first unbalanced input/output port due to strong attenuation. Further, the second center electrode is connected to the ground. Thus, stray capacitance generated when mounted on a circuit board is reduced or prevented as much as possible. The frequency of transmitting signal is primarily determined by the inductance component of the first center electrode and the capacitance component of the first capacitor element. The frequency of received signal is primarily determined by the inductance component of the second center electrode and the capacitance component of the second capacitor element. As described above, one of the ports of the nonreciprocal circuit element is configured as the balanced input/output port, allowing the nonreciprocal circuit element to function as a circulator. Accordingly, the nonreciprocal circuit element preferably is used as a circulator that has preferable isolation characteristics and a wider fractional bandwidth, as will be described in detail in the following preferred embodiments of the present invention.

Various preferred embodiments of the present invention provide a nonreciprocal circuit element and a transceiver device, each having preferable isolation characteristics, a wider fractional bandwidth, and stable characteristics.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
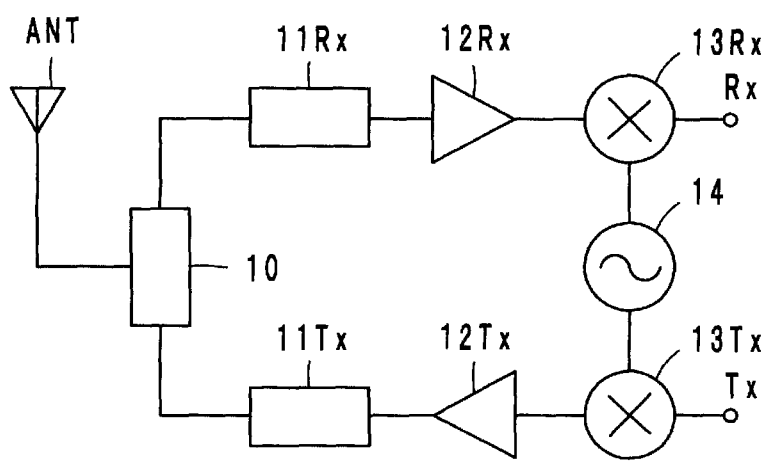
FIG. 1 is a block diagram illustrating an exemplary transceiver device of a cellular phone.
Figure 2:
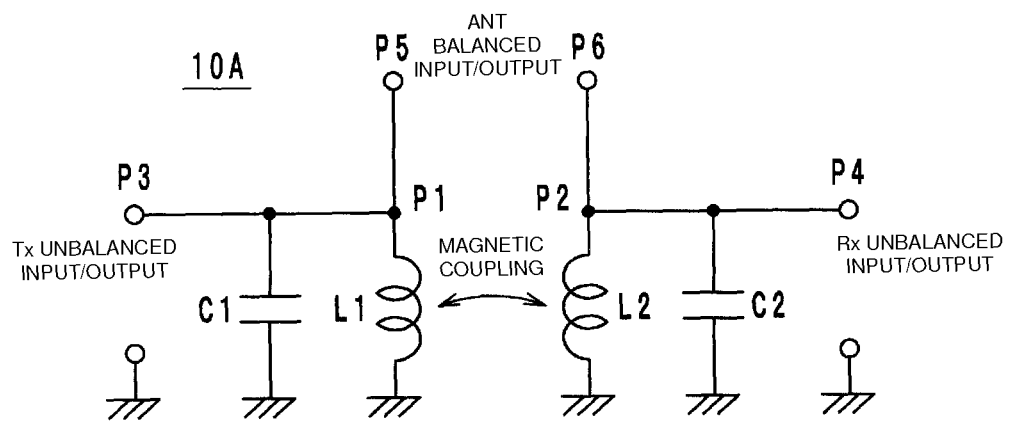
FIG. 2 is an equivalent circuit diagram illustrating a circulator according to a first preferred embodiment of the present invention.

A nonreciprocal circuit element and a transceiver device according to preferred embodiments of the present invention will be described below with reference to accompanying drawings. Note that the same reference numerals designate the same materials and elements in the respective drawings, and the same descriptions thereof are omitted. Further, in FIG. 3, FIG. 4, FIG. 9, FIG. 10, FIG. 15, and FIG. 16, shaded portions are conductors.

As illustrated in FIG. 1, in a transceiver device according to a preferred embodiment of the present invention, an antenna ANT is connected to a circulator 10 that defines and functions as an antenna duplexer. One of ports of the circulator 10 is connected to a receiver signal port Rx via a receiver side filter 11Rx, a low noise amplifier 12Rx, and a mixer 13Rx. The other port of the circulator 10 is connected to a transmitter signal port Tx via a transmitter side filter 11Tx, a power amplifier 12Tx, and a mixer 13Tx. A voltage controlled oscillator 14 is connected between the mixers 13Rx and 13Tx.

A high frequency signal received with the antenna ANT is transmitted to the receiver side filter 11Rx via the circulator 10, and then transmitted to the receiver signal port Rx via the low noise amplifier 12Rx and the mixer 13Rx. A high frequency signal inputted from the transmitter signal port Tx is transmitted to the circulator 10 via the mixer 13Tx, the power amplifier 12Tx, and the transmitter side filter 11Tx, and further transmitted from the circulator 10 to the antenna ANT. To accommodate multiple communication systems, the circulator 10 preferably has a wide bandwidth such as a fractional bandwidth of about 30%, for example. In the following description, the circulator 10 capable of satisfying a requirement of this kind is described.

First Preferred Embodiment

A circulator 10A according to the first preferred embodiment is configured to have a lumped-constant type equivalent circuit illustrated in FIG. 1. In other words, a first center electrode L1 and a second center electrode L2 are magnetically coupled, and one end portion P1 of the first center electrode L1 is connected to a first unbalanced input/output port P3 and one port P5 of balanced input/output ports. Further, the other end portion of the first center electrode L1 is connected to ground. One end portion P2 of the second center electrode L2 is connected to the other port P6 of the balanced input/output ports and a second unbalanced input/output port P4. Further, the other end portion of the second center electrode L2 is connected to the ground. Further, the end portion P1 of the first center electrode L1 is connected to the ground via a first capacitor element C1, and the end portion P2 of the second center electrode L2 is connected to the ground via a second capacitor element C2.

Figure 3:
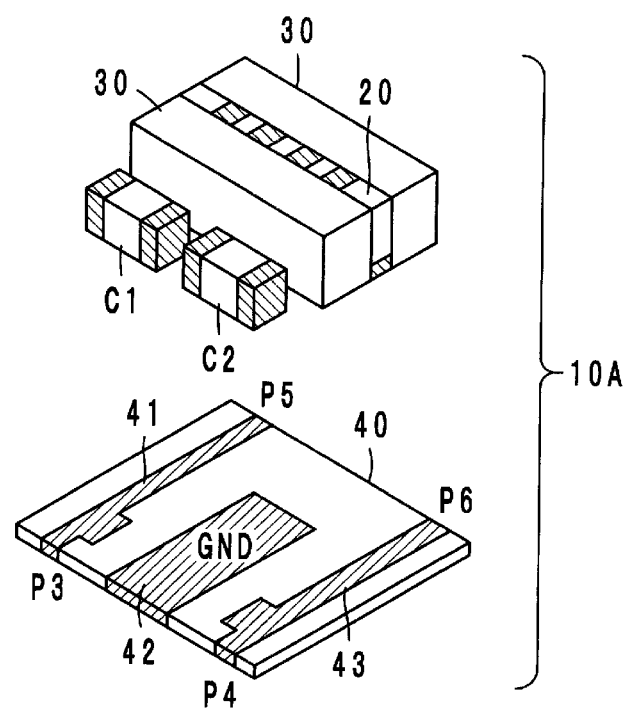
FIG. 3 is an exploded perspective view illustrating the circulator according to the first preferred embodiment of the present invention.
Figure 4:
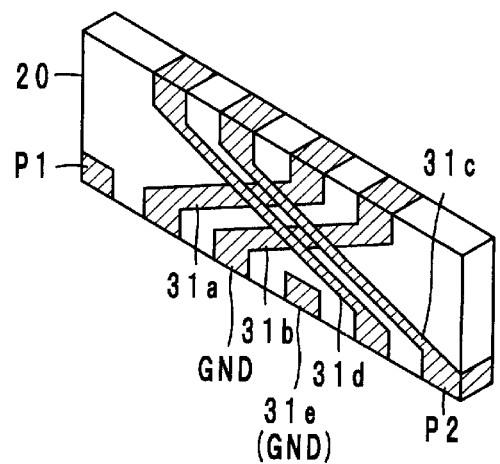
FIG. 4 is a perspective view illustrating center electrodes and a ferrite that form the circulator according to the first preferred embodiment of the present invention.

Specifically, as illustrated in FIG. 3 and FIG. 4, the circulator 10A is configured such that the first center electrode L1 and the second center electrode L2 are arranged on a front surface and a back surface of a ferrite 20 so as to cross each other while being insulated from each other, and that a direct-current magnetic field produced by a pair of permanent magnets 30 is applied to the ferrite 20. The ferrite 20 is sandwiched and supported by the pair of permanent magnets 30 and mounted on a circuit board 40 together with the capacitor elements C1 and C2.

The end portion P1 of the first center electrode L1 extends along the back surface of the ferrite 20 and is connected to an upper end of an electrode 31a. The electrode 31a extends farther from its bottom end to the back surface side of the ferrite 20 and is connected to an upper end of an electrode 31b. A bottom end of the electrode 31b is connected to the ground. In the second center electrode L2, one end portion of an electrode 31c defines the end portion P2. The electrode 31c extends farther from its upper end to the back surface side of the ferrite 20 and is connected to a bottom end of an electrode 31*d*. The electrode 31*d* extends farther from its upper end to the back surface side of the ferrite 20 and is connected to the ground via an electrode 31*e*.

As described above, shapes of the first and second center electrodes L1 and L2 are rotationally symmetric about a direction vertical to the circuit board 40, and are configured so that each has the same or substantially the same inductance. Note that, in the first and second center electrodes L1 and L2, the bottom end of the electrode 31*b* and the electrode 31*e* that are connected to the ground may be formed together as a single unitary structure, for example.

Conductors 41, 42, and 43 are provided on an upper surface of the circuit board 40. The end portion P1 of the first center electrode L1 is connected to the conductor 41. One end portion of the conductor 41 defines and functions as the first unbalanced input/output port P3 while the other end portion thereof defines and defines and functions as the port P5, the one of the balanced input/output ports. The other end portions (electrodes 31*b* and 31*e*) of the first and second center electrodes L1 and L2 are connected to the conductor 42. The conductor 42 defines and functions as a ground port. The end portion P2 of the second center electrode L2 is connected to the conductor 43. One end portion of the conductor 43 defines and functions as the second unbalanced input/output port P4 while the other end portion defines and functions as the port P6, the other port of the balanced input/output ports. Further, the first capacitor element C1 is connected between the conductor 41 and the conductor 42, and the second capacitor element C2 is connected between the conductor 42 and the conductor 43.

In the circulator 10A as configured above, the first unbalanced input/output port P3 is connected to the transmitter side, the balanced input/output ports P5 and P6 are connected the antenna ANT, and the second unbalanced input/output port P4 is connected to the receiver side.

A transmitting signal inputted to the first unbalanced input/output port P3 is outputted in-phase to the port P5, one of the balanced input/output ports, and outputted in reversed phase to the other port P6. No signal is transmitted to the second unbalanced input/output port P4 due to strong attenuation. A received signal inputted to the balanced input/output ports P5 and P6 is outputted from the second unbalanced input/output port P4. No signal is transmitted to the first unbalanced input/output port P3 due to strong attenuation. A high frequency signal inputted to the second unbalanced input/output port P4 is not outputted from the balanced input/output ports P5 and P6 since it is outputted in-phase to both of the balanced input/output ports, but flows to the first unbalanced input/output port P3.

Here, in a case where the circulator 10A is preferably used as an antenna duplexer of cellular phone, for example, a transmission band is from about 698 MHz to about 915 MHz and a reception band is from about 728 MHz to about 960 MHz for a system including Band 8 and Band 12 of WCDMA, for example.

Next, some characteristics of the circulator 10A are described with reference to FIG. 5, FIG. 6, and FIG. 7. The circulator 10A used here is preferably configured as follows. The size of ferrite 20 preferably is approximately 1.7×0.5 mm square with a thickness of about 0.2 mm, for example. The first and second center electrodes L1 and L2 each preferably have a width of about 50 μm, for example. The first capacitor element C1 preferably has a capacitance of about 6.2 pF, and the second capacitor element C2 preferably has a capacitance of about 5.2 pF, for example. Balanced input/output impedance is about 50Ω, and unbalanced input/output impedance is about 50Ω, for example.

Figure 5:
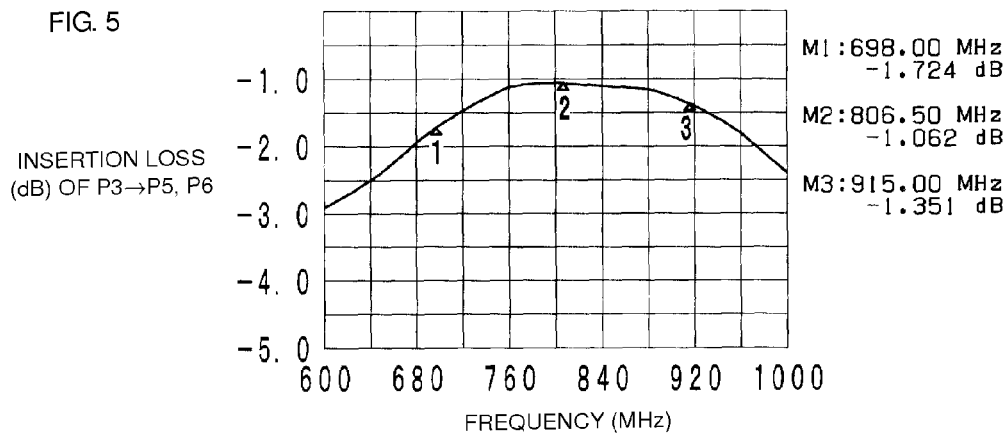
FIG. 5 is a graph illustrating insertion loss from a first unbalanced input/output port to a balanced input/output port in the circulator according to the first preferred embodiment of the present invention.
Figure 6:
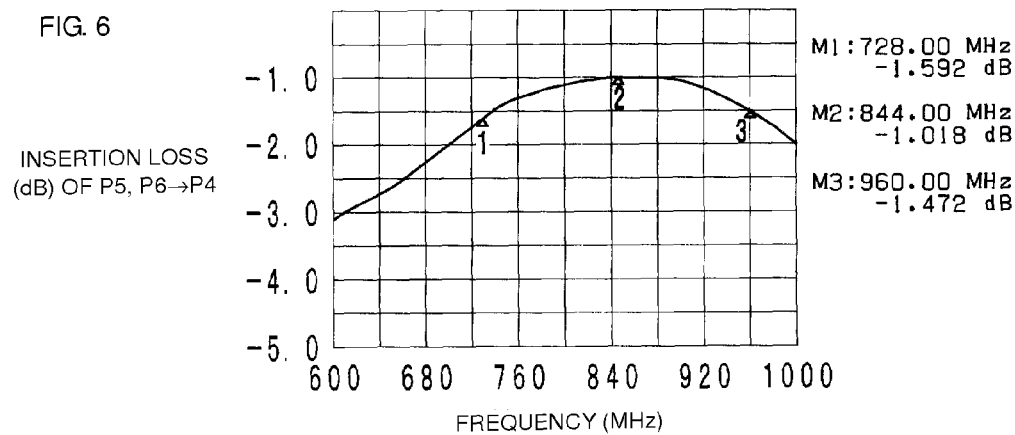
FIG. 6 is a graph illustrating the insertion loss from the balanced input/output port to a second unbalanced input/output port in the circulator according to the first preferred embodiment of the present invention.
Figure 7:
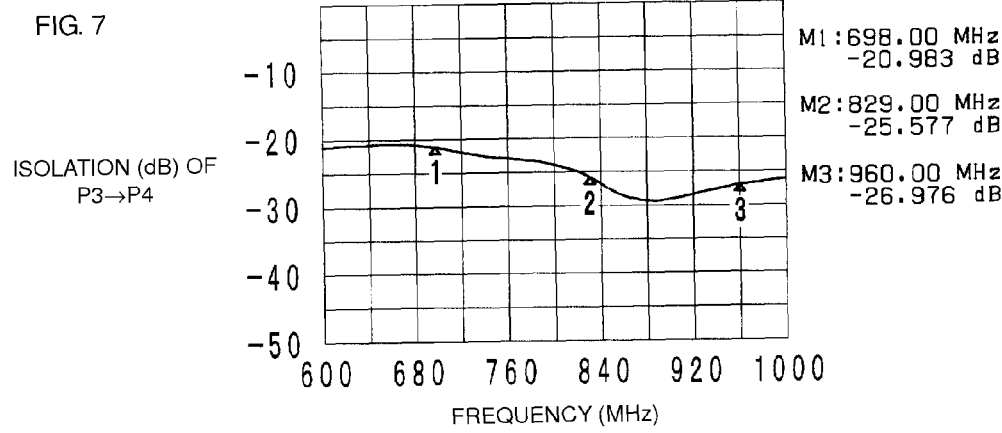
FIG. 7 is a graph illustrating isolation from the first unbalanced input/output port to the second unbalanced input/output port in the circulator according to the first preferred embodiment of the present invention.

FIG. 5 illustrates insertion loss characteristics from P3 to P5 and P6, FIG. 6 illustrates the insertion loss characteristics from P5 and P6 to P4, and FIG. 7 illustrates isolation characteristics from P3 to P4 when the first unbalanced input/output port P3 is connected to the transmitter side, the balanced input/output ports P5 and P6 are connected to the antenna ANT, and the second unbalanced input/output port P4 is connected to the receiver side, as described above. As evident from FIG. 5, the insertion loss of a transmitting signal at about 698 MHz to about 915 MHz is about 1.7 dB, for example. As evident from FIG. 6, the insertion loss of a received signal at about 746 MHz to about 960 MHz is about 1.6 dB, for example. As evident from FIG. 7, the isolation of a transmitting signal to the receiver side at about 698 MHz to about 960 MHz is about 21.0 dB, and a fractional bandwidth in which the isolation is about 20 dB or more is equal to or larger than about 30%, for example.

Further, the first and second center electrodes L1 and L2 are both connected to the ground. Thus, stray capacitance generated when mounted on the circuit board 40 is reduced as much as possible. The frequency of transmitting signal is primarily determined by the inductance component of the first center electrode L1 and the capacitance component of the first capacitor element C1. The frequency of received signal is primarily determined by the inductance component of the second center electrode L2 and the capacitance component of the second capacitor element C2.

Second Preferred Embodiment

Figure 8:
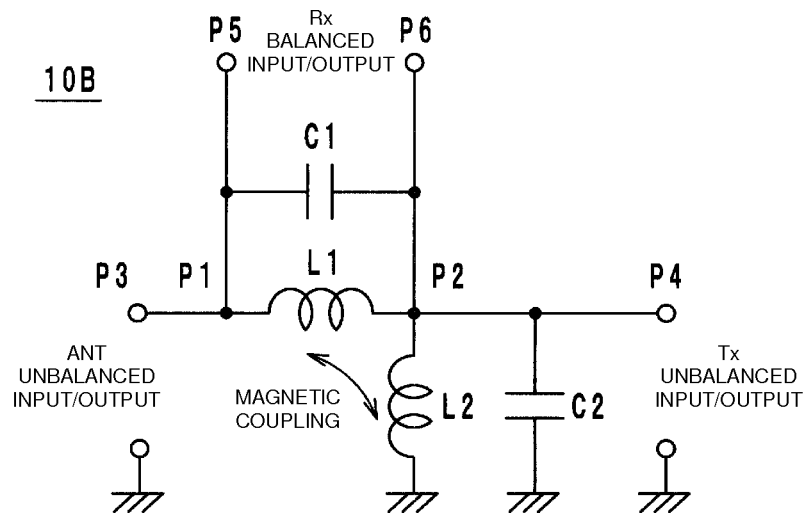
FIG. 8 is an equivalent circuit diagram illustrating a circulator according to a second preferred embodiment of the present invention.

A circulator 10B according to a second preferred embodiment is configured to have a lumped-constant type equivalent circuit illustrated in FIG. 8. In other words, a first center electrode L1 and a second center electrode L2 are magnetically coupled. Further, one end portion P1 of the first center electrode L1 is connected to a first unbalanced input/output port P3 and one port P5 of balanced input/output ports. One end portion P2 of the second center electrode L2 is connected to the other end portion of the first center electrode L1, and also connected to the other port P6 of the balanced input/output ports and a second unbalanced input/output port P4. Further, the other end portion of the second center electrode L2 is connected to the ground. Further, a first capacitor element C1 is connected between the balanced input/output ports P5 and P6 in parallel to the first center electrode L1. The end portion P2 of the second center electrode L2 is connected to the ground via a second capacitor element C2.

Figure 9:
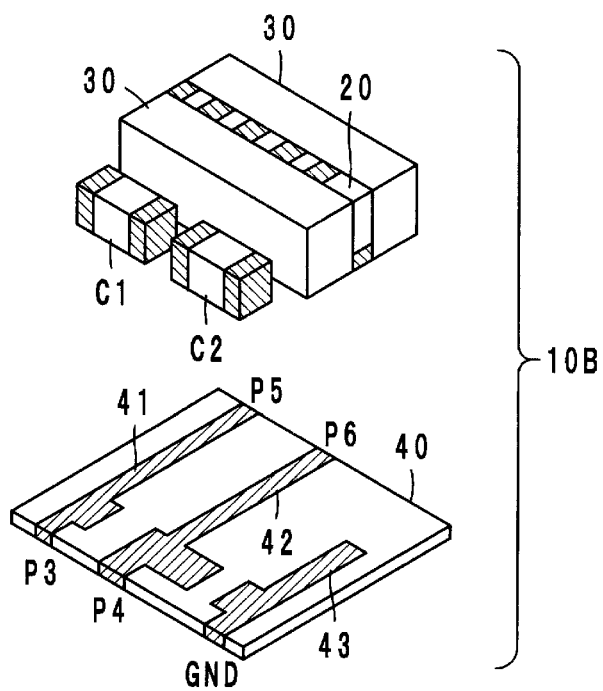
FIG. 9 is an exploded perspective view illustrating the circulator according to the second preferred embodiment of the present invention.
Figure 10:
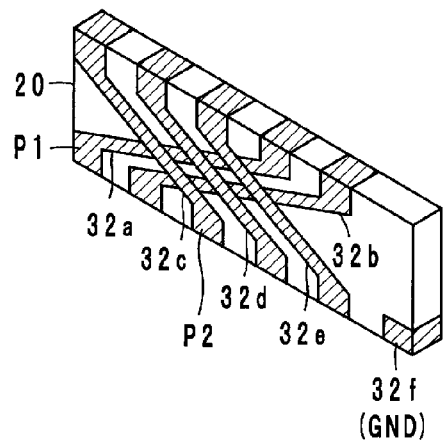
FIG. 10 is a perspective view illustrating center electrodes and a ferrite that define the circulator according to the second preferred embodiment of the present invention.

Specifically, as illustrated in FIG. 9 and FIG. 10, the circulator 10B is configured such that the first center electrode L1 and the second center electrode L2 are arranged on a front surface and a back surface of a ferrite 20 so as to cross each other while being insulated from each other, and that a direct-current magnetic field produced by a pair of permanent magnets 30 is applied to the ferrite 20. The ferrite 20 is sandwiched and supported by the pair of permanent magnets 30 and mounted on a circuit board 40 together with the capacitor elements C1 and C2.

In the first center electrode L1, one end portion of an electrode 32*a* defines the end portion P1. The electrode 32*a* extends farther from its upper end to the back surface side of the ferrite 20 and is connected to a bottom end of an electrode 32*b*. The electrode 32*b* extends farther from its upper end to the back surface side of the ferrite 20 and is connected to a bottom end of an electrode 32*c*. The second center electrode L2 starts from the bottom end of the electrode 32c, extends farther from its upper side to the back surface side of the ferrite 20, and is connected to a bottom end of an electrode 32d. The electrode 32d extends farther from its upper end to the back surface side of the ferrite 20 and is connected to a bottom end of an electrode 32e. The electrode 32e extends farther from its upper end to the back surface side of the ferrite 20, and an electrode 32f is connected to the ground.

As described above, the ferrite 20 is wrapped with two turns of the first center electrode L1 and three turns of the second center electrode L2. Accordingly, the second center electrode L2 is configured to have a larger inductance than that of the first center electrode L1.

Conductors 41, 42, and 43 are provided on an upper surface of the circuit board 40. The end portion P1 of the first center electrode L1 is connected to the conductor 41. One end portion of the conductor 41 defines and functions as the first unbalanced input/output port P3 while the other end portion defines and functions as the port P5 of the balanced input/output ports. The other end portions (bottom end of the electrode 32c) of the first and second center electrodes L1 and L2 are connected to the conductor 42. One end portion of the conductor 42 defines and functions as the second unbalanced input/output port P4 while the other end portion defines and functions as the port P6 of the balanced input/output ports. Further, the first capacitor element C1 is connected between the conductor 41 and the conductor 42, and the second capacitor element C2 is connected between the conductor 42 and the conductor 43.

In the circulator 10B as configured above, the first unbalanced input/output port P3 is connected to the antenna ANT, the balanced input/output ports P5 and P6 are connected to the receiver side, and the second unbalanced input/output port P4 is connected to the transmitter side.

A received signal inputted to the first unbalanced input/output port P3 is outputted in-phase to the one port P5 of the balanced input/output ports and outputted in reversed phase to the other port P6. No signal is transmitted to the second unbalanced input/output port P4 due to strong attenuation. A transmitting signal inputted to the second unbalanced input/output port P4 is not outputted from the balanced input/output ports P5 and P6 since it is outputted in-phase to both of the balanced input/output ports, but is outputted from the first unbalanced input/output port P3 to the antenna ANT. A high frequency signal inputted to the balanced input/output ports P5 and P6 is outputted from the second unbalanced input/output port. No signal is transmitted to the first unbalanced input/output port due to strong attenuation.

Here, some characteristics are described with reference to FIG. 11, FIG. 12, and FIG. 13 when the circulator 10B is used, for example, as an antenna duplexer of cellular phone of the communication system described in the foregoing first preferred embodiment. The circulator 10B used here is preferably configured as follows. The size of ferrite 20 preferably is approximately 1.7×0.5 mm square with a thickness of about 0.2 mm, for example. The first and second center electrodes L1 and L2 each preferably have a width of about 50 μm, for example. The first capacitor element C1 preferably has a capacitance of about 5.3 pF, and the second capacitor element C2 preferably has a capacitance of about 3.4 pF. Balanced input/output impedance preferably is about 50Ω, and unbalanced input/output impedance preferably is about 50Ω, for example.

Figure 11:
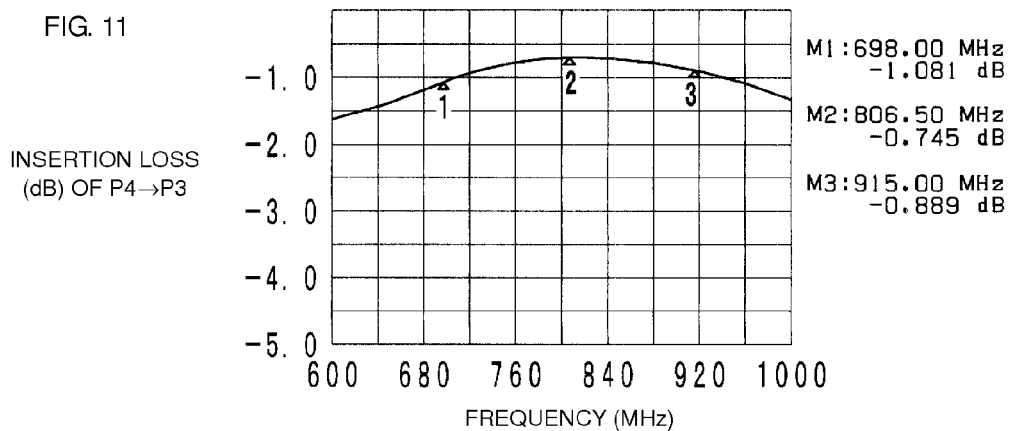
FIG. 11 is a graph illustrating the insertion loss from a second unbalanced input/output port to a first unbalanced input/output port in the circulator according to the second preferred embodiment of the present invention.
Figure 12:
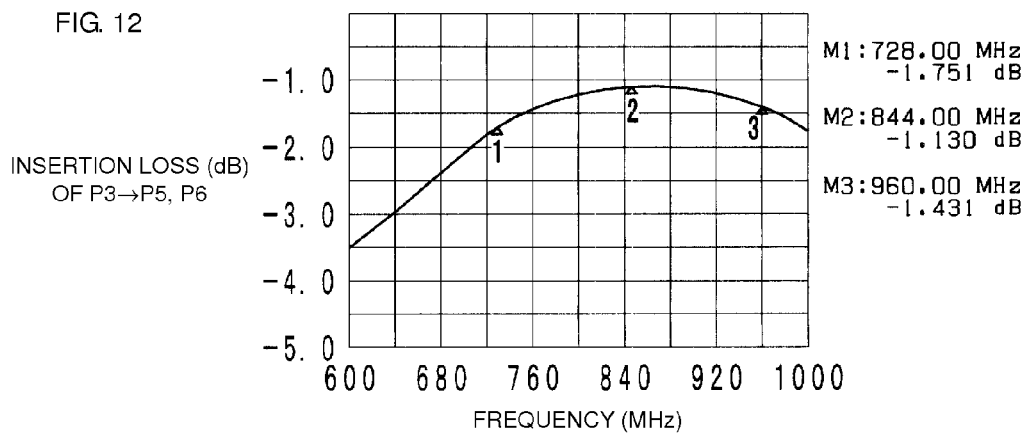
FIG. 12 is a graph illustrating the insertion loss from the first unbalanced input/output port to a balanced input/output port in the circulator according to the second preferred embodiment of the present invention.
Figure 13:
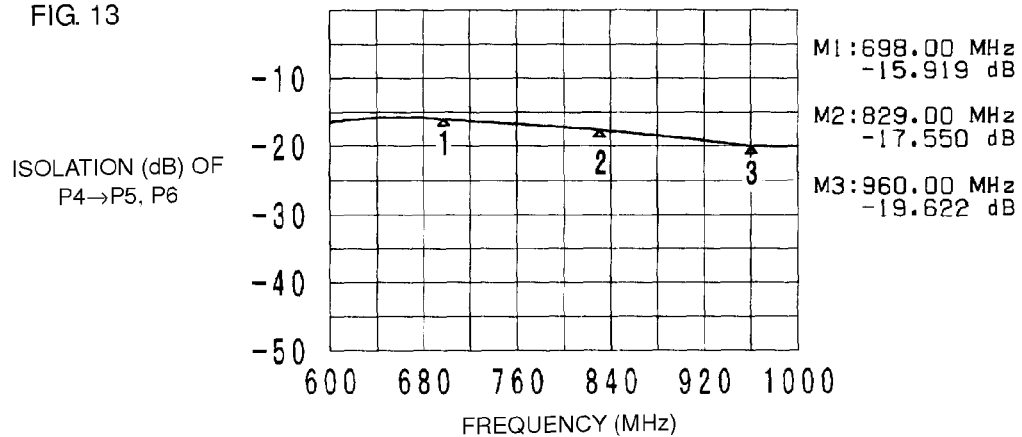
FIG. 13 is a graph illustrating the isolation from the second unbalanced input/output port to the balanced input/output port in the circulator according to the second preferred embodiment of the present invention.

FIG. 11 illustrates the insertion loss characteristics from P4 to P3, FIG. 12 illustrates the insertion loss characteristics from P3 to P5 and P6, and FIG. 13 illustrates the isolation characteristics from P4 to P5 and P6 when the first unbalanced input/output port P3 is connected to the antenna ANT, the balanced input/output ports P5 and P6 are connected to the receiver side, and the second unbalanced input/output port P4 is connected to the transmitter side, as described above. As evident from FIG. 11, the insertion loss of transmitting signal at about 698 MHz to about 915 MHz is about 1.1 dB. As evident from FIG. 12, the insertion loss of received signal at about 728 MHz to about 960 MHz is about 1.8 dB. As evident from FIG. 13, the isolation of transmitting signal to the receiver side at about 698 MHz to about 960 MHz is about 15.9 dB, and a fractional bandwidth in which the isolation is 15 dB or more is equal to or larger than about 30%, for example.

Further, the second center electrode L2 is connected to the ground. Thus, stray capacitance generated when mounted on the circuit board 40 is reduced or prevented as much as possible. The frequency of received signal is primarily determined by the inductance component of the first center electrode L1 and the capacitance component of the first capacitor element C1. The frequency of transmitting signal is primarily determined by the inductance component of the second center electrode L2 and the capacitance component of the second capacitor element C2. Typically, the insertion loss from the transmitter side to the antenna ANT is considered more important than the insertion loss from the antenna ANT to the receiver side. As in the second embodiment described here, the insertion loss from the transmitter side to the antenna ANT may be made smaller than the insertion loss from the antenna ANT to the receiver side by making the inductance of the second center electrode L2 larger than that of the first center electrode L1. Further, the receiver side is configured as a balanced output. This makes it possible to reduce common mode noise in a reception band.

Third Preferred Embodiment

Figure 14:
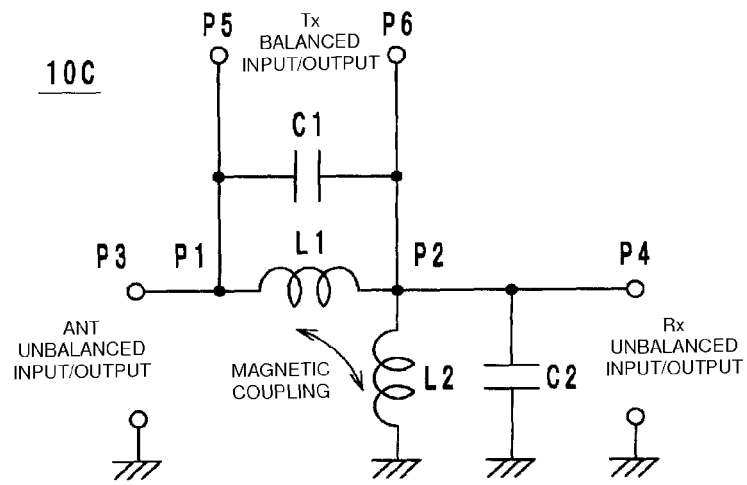
FIG. 14 is an equivalent circuit diagram illustrating a circulator according to the third preferred embodiment of the present invention.
Figure 15:
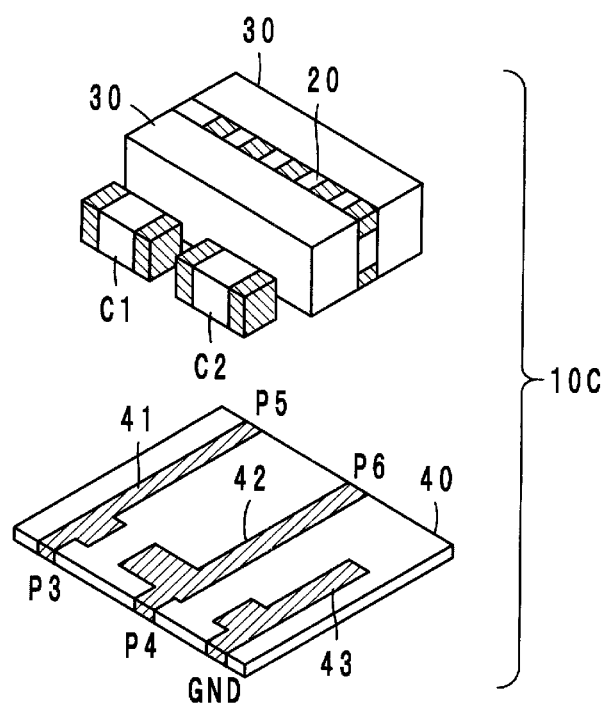
FIG. 15 is an exploded perspective view illustrating the circulator according to the third preferred embodiment of the present invention.
Figure 16:
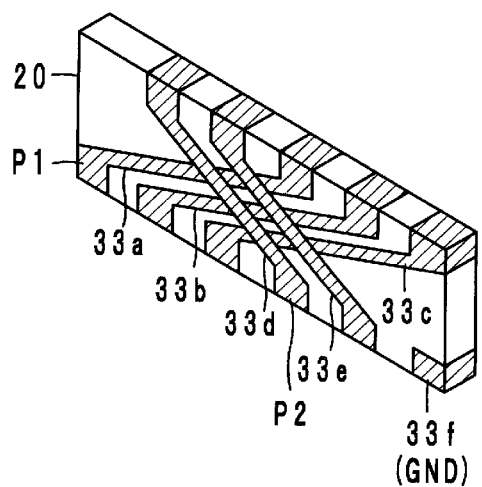
FIG. 16 is a perspective view illustrating center electrodes and a ferrite that define the circulator according to the third preferred embodiment of the present invention.

A circulator 10C according to a third preferred embodiment of the present invention is configured to have a lumped-constant type equivalent circuit illustrated in FIG. 14. This equivalent circuit and its basic configuration are similar to those of the second preferred embodiment except that structures of the first and second center electrodes L1 and L2 (inductance ratio) are different and that the magnetic field direction applied by the permanent magnets 30 is opposite to that in the second preferred embodiment.

In the first center electrode L1, one end portion of an electrode 33a defines the end portion P1. The electrode 33a extends around its upper end to the back surface side of the ferrite 20 and is connected to a bottom end of an electrode 33b. The electrode 33b extends to the back surface side of the ferrite 20 and is connected to a bottom end of an electrode 33c. The electrode 33c extends to the back surface side of the ferrite 20 and is connected to a bottom end of an electrode 33d. The second center electrode L2 starts from the bottom end of the electrode 33d, extends farther from its upper end to the back surface side of the ferrite 20 and is connected to a bottom end of an electrode 33e. The electrode 33e extends farther from its upper end to the back surface side of the ferrite 20, and an electrode 33f is connected to the ground.

As described above, the ferrite 20 is wrapped with three turns of the first center electrode L1 and two turns of the second center electrode L2. Accordingly, the first center electrode L1 is configured to have a larger inductance than that of the second center electrode L2.

The ferrite 20 and the capacitor elements C1 and C2 are mounted on the circuit board 40 in the same way as described in the second preferred embodiment.

In the circulator 10C as configured above, the first unbalanced input/output port P3 is connected to the antenna ANT, the balanced input/output ports P5 and P6 are connected the transmitter side, and the second unbalanced input/output port P4 is connected to the receiver side.

A received signal inputted to the first unbalanced input/output port P3 is not outputted from the balanced input/output ports P5 and P6 since it is outputted in-phase to both the ports P5 and P6 of the balanced input/output ports, but is outputted to the second unbalanced input/output port P4. A transmitting signal inputted to the balanced input/output ports P5 and P6 is outputted from the first unbalanced input/output port P3 to the antenna ANT. No signal is transmitted to the second unbalanced input/output port P4 due to strong attenuation. A high frequency signal inputted to the second unbalanced input/output port is outputted in-phase to the one port of the balanced input/output ports and outputted in reversed phase to the other port. No signal is transmitted to the first unbalanced input/output port P3 due to strong attenuation.

Here, some characteristics are described with reference to FIG. 17, FIG. 18, and FIG. 19 when the circulator 10C is preferably used, for example, as an antenna duplexer of cellular phone of the communication system described in the first preferably embodiment. The circulator used here preferably is configured as follows. The size of ferrite 20 preferably is approximately 1.7×0.5 mm square with a thickness of about 0.2 mm, for example. The first and second center electrodes L1 and L2 each preferably have a width of about 50 μm, for example. The first capacitor element C1 preferably has a capacitance of about 3.6 pF, and the second capacitor element C2 preferably has a capacitance of 5.7 pF, for example. Balanced input/output impedance preferably is about 50Ω, and unbalanced input/output impedance preferably is about 50Ω, for example.

Figure 17:
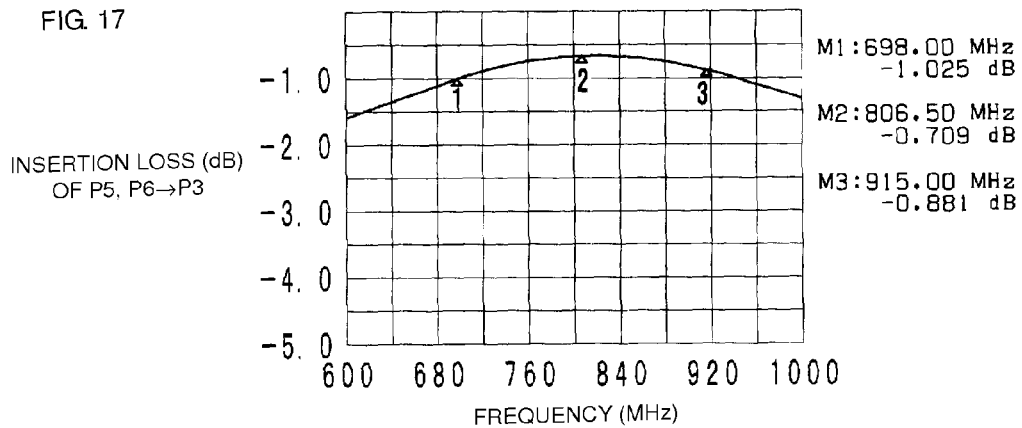
FIG. 17 is a graph illustrating the insertion loss from a balanced input/output port to a first unbalanced input/output port in the circulator according to the third preferred embodiment of the present invention.
Figure 18:
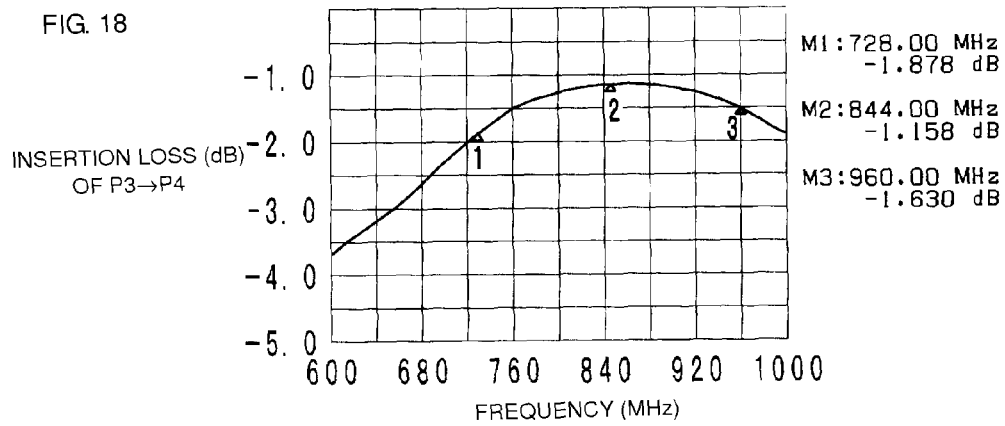
FIG. 18 is a graph illustrating the insertion loss from the first unbalanced input/output port to a second unbalanced input/output port in the circulator according to the third preferred embodiment of the present invention.
Figure 19:
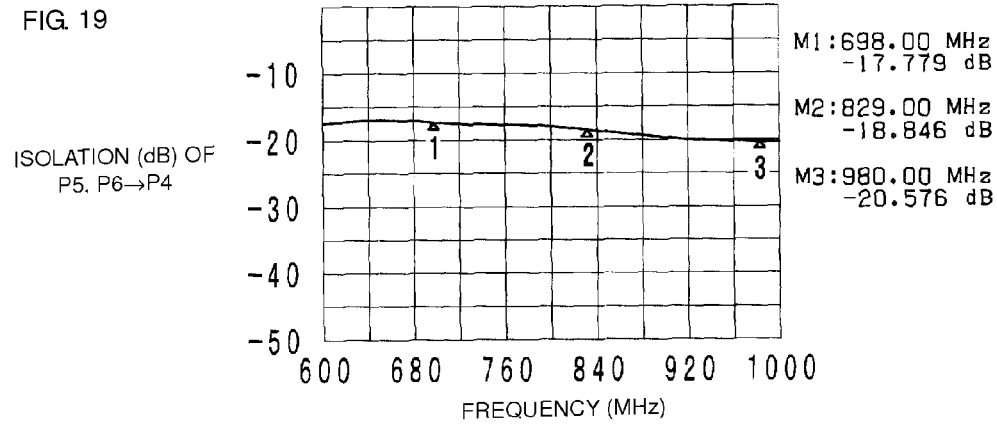
FIG. 19 is a graph illustrating the isolation from the balanced input/output port to the second unbalanced input/output port in the circulator according to the third preferred embodiment of the present invention.

FIG. 17 illustrates the insertion loss characteristics from P5 and P6 to P3, FIG. 18 illustrates the insertion loss characteristics from P3 to P4, and FIG. 19 illustrates the isolation characteristics from P5 and P6 to P4 when the first unbalanced input/output port P3 is connected to the antenna ANT, the balanced input/output ports P5 and P6 are connected to the transmitter side, and the second unbalanced input/output port P4 is connected to the receiver side, as described above. As evident from FIG. 17, the insertion loss of transmitting signal at about 698 MHz to about 915 MHz is about 1.0 dB. As evident from FIG. 18, the insertion loss of received signal at about 746 MHz to about 960 MHz is about 1.9 dB. As evident from FIG. 19, the isolation of transmitting signal to the receiver side at about 698 MHz to about 960 MHz is about 17.8 dB, and a fractional bandwidth in which the isolation is about 15 dB or more is equal to or larger than about 30%, for example.

Further, the second center electrode L2 is connected to the ground. Thus, stray capacitance generated when mounted on the circuit board 40 is reduced or prevented as much as possible. The frequency of transmitting signal is primarily determined by the inductance component of the first center electrode L1 and the capacitance component of the first capacitor element C1. The frequency of received signal is primarily determined by the inductance component of the second center electrode L2 and the capacitance component of the second capacitor element C2. Typically, the insertion loss from the transmitter side to the antenna ANT is considered more important than the insertion loss from the antenna ANT to the receiver side. As in the third preferred embodiment described here, the insertion loss from the transmitter side to the antenna ANT may be made smaller than the insertion loss from the antenna ANT to the receiver side by making the inductance of the first center electrode L1 larger than that of the second center electrode L2. Further, the transmitter side is configured as a balanced input. This makes it possible to reduce common mode noise in a transmission band.

It should be understood that the nonreciprocal circuit element and the transceiver device according to the present invention are not limited to the foregoing preferred embodiments, and that various modifications and changes may be made within the spirit and scope of the present invention.

Particularly, details such as structures or shapes of the ferrite or the permanent magnet may be determined arbitrarily. Further, the capacitor element may be formed on the circuit board by reconstruction, for example.

As described above, preferred embodiments of the present invention are beneficial to nonreciprocal circuit elements and transceiver devices, and in particular are superior in having preferable isolation characteristics, a wider fractional bandwidth, and stable characteristics.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A nonreciprocal circuit element comprising:
    a ferrite; and
    a first center electrode and a second center electrode arranged on the ferrite so as to cross each other and be insulated from each other, and to which a direct current magnetic field generated by the permanent magnet is applied; wherein
    one end portion of the first center electrode is connected to one of a plurality of balanced input/output ports and a first unbalanced input/output port and another end portion of the first center electrode is connected to ground;
    one end portion of the second center electrode is connected to another port of the plurality of balanced input/output ports and a second unbalanced input/output port and another end portion of the second center electrode is connected to the ground;
    the one end portion of the first center electrode is connected to the ground via a first capacitor element; and
    the one end portion of the second center electrode is connected to the ground via a second capacitor element.

2. The nonreciprocal circuit element according to claim 1, wherein the non-reciprocal circuit element has a fractional bandwidth of about 30%.

3. The nonreciprocal circuit element according to claim 1, wherein the non-reciprocal circuit element is a lumped-constant equivalent circuit.

4. The nonreciprocal circuit element according to claim 1, wherein the non-reciprocal circuit element is an antenna duplexer.

5. A transceiver device comprising:
    a nonreciprocal circuit element;
    an antenna;
    a receiver side port; and
    a transmitter side port; wherein
    the nonreciprocal circuit element includes:
    a ferrite; and
    a first center electrode and a second center electrode arranged on the ferrite so as to cross each other and be insulated from each other, and to which a direct current magnetic field generated by the permanent magnet is applied; wherein one end portion of the first center electrode is connected to one of a plurality of balanced input/output ports and a first unbalanced input/output port and another end portion of the first center electrode is connected to ground;

one end portion of the second center electrode is connected to another port of the plurality of balanced input/output ports and a second unbalanced input/output port and another end portion of the second center electrode is connected to the ground;

the one end portion of the first center electrode is connected to the ground via a first capacitor element;

the one end portion of the second center electrode is connected to the ground via a second capacitor element; and the first unbalanced input/output port is connected to the transmitter side port;

the balanced input/output port is connected to the antenna; and the second unbalanced input/output port is connected to the receiver side port.

6. The transceiver device according to claim 5, wherein the non-reciprocal circuit element has a fractional bandwidth of about 30%.

7. The transceiver device according to claim 5, wherein the non-reciprocal circuit element is a lumped-constant equivalent circuit.

8. The transceiver device according to claim 5, wherein the non-reciprocal circuit element is an antenna duplexer.

9. The transceiver device according to claim 5, wherein the transceiver device is a cellular phone.

10. A nonreciprocal circuit element comprising:
a ferrite; and
a first center electrode and a second center electrode arranged on the ferrite so as to cross each other and be insulated from each other, and to which a direct current magnetic field generated by the permanent magnet is applied; wherein
one end portion of the first center electrode is connected to one of a plurality of balanced input/output ports and a first unbalanced input/output port;
one end portion of the second center electrode is connected to another end portion of the first center electrode and another port of the plurality of balanced input/output ports as well as a second unbalanced input/output port and another end portion of the second center electrode is connected to the ground;
a first capacitor element is connected between the balanced input/output ports in parallel to the first center electrode; and
the one end portion of the second center electrode is connected to the ground via a second capacitor element.

11. The nonreciprocal circuit element according to claim 10, wherein the non-reciprocal circuit element has a fractional bandwidth of about 30%.

12. The nonreciprocal circuit element according to claim 10, wherein the non-reciprocal circuit element is a lumped-constant equivalent circuit.

13. The nonreciprocal circuit element according to claim 10, wherein the non-reciprocal circuit element is an antenna duplexer.

14. A transceiver device comprising:
a nonreciprocal circuit element;
an antenna;
a receiver side port; and
a transmitter side port; wherein
the nonreciprocal circuit element includes:
a ferrite; and
a first center electrode and a second center electrode arranged on the ferrite so as to cross each other and be insulated from each other, and to which a direct current magnetic field generated by the permanent magnet is applied; wherein
one end portion of the first center electrode is connected to one of plurality of balanced input/output ports and a first unbalanced input/output port;
one end portion of the second center electrode is connected to another end portion of the first center electrode and another port of the plurality of balanced input/output ports as well as a second unbalanced input/output port and another end portion of the second center electrode is connected to the ground;
a first capacitor element is connected between the balanced input/output ports in parallel to the first center electrode;
the one end portion of the second center electrode is connected to the ground via a second capacitor element;
the first unbalanced input/output port is connected to the antenna;
the balanced input/output port is connected to the receiver side port; and
the second unbalanced input/output port is connected to the transmitter side port.

15. The transceiver device according to claim 14, wherein the non-reciprocal circuit element has a fractional bandwidth of about 30%.

16. The transceiver device according to claim 14, wherein the non-reciprocal circuit element is a lumped-constant equivalent circuit.

17. The transceiver device according to claim 14, wherein the non-reciprocal circuit element is an antenna duplexer.

18. The transceiver device according to claim 14, wherein the transceiver device is a cellular phone.

19. A transceiver device comprising:
a nonreciprocal circuit element;
an antenna;
a receiver side port; and
a transmitter side port; wherein
the nonreciprocal circuit element includes:
a ferrite; and
a first center electrode and a second center electrode arranged on the ferrite so as to cross each other and be insulated from each other, and to which a direct current magnetic field generated by the permanent magnet is applied; wherein
one end portion of the first center electrode is connected to one of a plurality of balanced input/output ports and a first unbalanced input/output port;
one end portion of the second center electrode is connected to another end portion of the first center electrode and another port of the plurality of balanced input/output ports as well as a second unbalanced input/output port and another end portion of the second center electrode is connected to the ground;
a first capacitor element is connected between the balanced input/output ports in parallel to the first center electrode;
the one end portion of the second center electrode is connected to the ground via a second capacitor element;
the first unbalanced input/output port is connected to the antenna;
the balanced input/output port is connected to the transmitter side port; and
the second unbalanced input/output port is connected to the received side port.

20. The transceiver device according to claim 19, wherein the transceiver device is a cellular phone.

* * * * *